(12) United States Patent
Lau et al.

(10) Patent No.: US 6,400,688 B1
(45) Date of Patent: Jun. 4, 2002

(54) METHOD FOR CONSOLIDATING BACKWARD RESOURCE MANAGEMENT CELLS FOR ABR SERVICES IN AN ATM NETWORK

(75) Inventors: Wing Cheong Lau, Eatontown; Yung-Terng Wang, Marlboro, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/159,109

(22) Filed: Sep. 23, 1998

(51) Int. Cl.7 .............................................. G01R 31/08
(52) U.S. Cl. .................... 370/236.1; 370/407; 370/408; 370/395.2
(58) Field of Search ................................ 370/229, 230, 370/231, 232, 233, 234, 235, 236, 237, 238, 239, 240, 395, 407, 408, 409, 395.2, 236.1

(56) References Cited

U.S. PATENT DOCUMENTS

| | | | | |
|---|---|---|---|---|
| 6,072,775 A | * | 6/2000 | Ikeda | 370/236 |
| 6,118,764 A | * | 9/2000 | Depelteau et al. | 370/235 |
| 6,252,875 B1 | * | 6/2001 | Kantuyosi | 370/390 |
| 6,298,042 B1 | * | 10/2001 | Murase et al. | 370/235 |

OTHER PUBLICATIONS

Jiang et al., "Improved Consolidation Algorithms for Point–to–Multipoint ABR Service," Proceedings of IEEE ATM Workshop, pp. 195–205, (May 1998).
Chiussi et al., "Dynamic Max Rate Control Algorithm for Available Bit Rate Service in ATM Networks," IEEE Globecom '96, pp. 2108–2117.
Roberts, Lawrence G., "Point–to–Multipoint ABR Operation," ATM Forum/95–0834 (Aug. 7, 1995).
Roberts, Lawrence G., "Addition to TM Spec 4.0 on Point–to–Multipoint," ATM Forum/95–0339 (Apr. 10, 1995).
Bonomi et al., "ABR Point–to–Multipoint Connections," ATM Forum/95–0974(R1), pp. 1–4.

(List continued on next page.)

*Primary Examiner*—Alpus H. Hsu
*Assistant Examiner*—Thien Tran
(74) *Attorney, Agent, or Firm*—Darby & Darby

(57) ABSTRACT

A method for consolidating backward resource management (BRM) cells in an available bit rate point-to-multipoint tree including a root, a plurality of leaves and a branch point interconnected between the root and the leaves. Initially, congestion information memory devices are reset. Then for each incoming return BRM cell to the branch point a determination is made whether the branch point has received a return BRM cell from a predetermined number of candidates in a candidate set of candidate-branches. If the branch point has not received a return BRM cell from the predetermined number of candidates in the candidate set then the congestion information from the incoming return BRM cell and the congestion information in the congestion information memory devices are consolidated in the congestion information memory devices. After the congestion information memory devices have been updated with the consolidated congestion information then the incoming return BRM cell is discarded and the determination is repeated for the next incoming return BRM cell. If the branch point has received a return BRM cell from the predetermined number of candidates in the candidate set then the congestion information from the incoming return BRM cell and the congestion information in the congestion information memory devices are consolidated in the incoming return BRM cell before being passed back to the root. The congestion information memory devices are then reset and the process is repeated for the next incoming return BRM cell. In addition, various methods may be used to control the rate of pass back of incoming return backward resource management cells at a branch point to a source.

30 Claims, 4 Drawing Sheets

OTHER PUBLICATIONS

Awdeh et al., "Point–to–Multipoint Behavior of ABR," ATM Forum/95–0941 (Aug. 7–11, 1995), pp. 1–3.

Roberts, Larry, "Rate Based Algorithm for Point–to–Multipoint ABR Service," ATM Forum/94–0772(R1) (Nov. 10, 1994).

Hunt, Doug, "Open Issues for ABR Point–Multipoint Connections," ATM Forum/95–1034 (Aug. 7–11, 1995).

The ATM Forum Technical Committee, "Traffic Management Specification," ATM Forum (Apr. 1996).

Fahmy et al., "Feedback Consolidation Algortihms for ABR Point–to–Multipoint Connections," ATM Forum/97–0615 (Jul. 1997).

* cited by examiner

METHOD FOR CONSOLIDATING BACKWARD RESOURCE MANAGEMENT CELLS FOR ABR SERVICES IN AN ATM NETWORK

FIELD OF THE INVENTION

The present invention is directed to a method for consolidating backward resource management cells for Available Bit Rate service in an Asynchronous Transfer Mode network.

In an Asynchronous Transfer Mode (ATM) network a plurality of service categories are available, as described in "The ATM Forum Technical Committee Traffic Management Specification", Version 4.0, af-tm-0056.000, April 1996, herein incorporated by reference. One such service is Available Bit Rate (ABR) in which the source rate, referred to as the allowed cell rate (ACR), at which the ABR source transmits data is adjusted in accordance with network congestion information feedback.

FIG. 1 shows an ABR flow control path between point-to-point end-systems (unicast) for controlling through feedback the source rate in response to changing ATM layer transfer characteristics. The point-to-point configuration includes a single sending end-system (source) 10, a single receiving end-system (destination) 20 and a network cloud 30 disposed therebetween. Network cloud 30 is an interconnection of transmission links and switching devices which provides a path for ATM traffic between the source and destination end-systems. Congestion points may exist in the network cloud and/or at the destination end-system. ABR flow control schemes are employed to control congestion at the congestion points in the network cloud and/or destination end-system which may increase queue-length, delay and/or cell loss.

In order to control the source rate, information such as bandwidth availability, state of congestion, and impending congestion of the network is conveyed to the source using Resource Management (RM) cells. In particular, RM cells include an Explicit Rate (ER) field that carries a 16-bit floating-point number representing the explicit rate, a Congestion Indication (CI) bit, which is used to signal a source to increase/decrease its rate by some predefined amount, and a No-Increase (NI) bit to signal a source to maintain its current rate.

Initially, source 10 generates Forward Resource Management (FRM) cells which are transmitted along with data cells via the network cloud 30 towards the destination 20. Backward Resource Management (BRM) cells are generated via looping back an FRM cell at the destination end-system and/or are directly created by various congestion points, e.g., ATM switches, in the network cloud. The BRM cells carry feedback information provided by the destination end-system as well as by other congestion points in the network cloud back to the source 10 which, in turn, adjusts its source rate based on the congestion information in the BRM cells. RM cells are marked with switch congestion information such as the ER field and CI and NI bits as they are transmitted in a forward direction (from the source toward the destination) or in a reverse direction (from the destination back toward the source).

End-systems may also be arranged in a more complex point-to-multipoint tree (multicast tree) including a source end-system (root) connected by branches to a plurality of destination end-systems (leaves) and at least one branch point disposed between the root and the leaves. Specifically, a branch is defined as any point-to-point segment of the point-to-multi-point tree and a branch point is an intersection of two or more branches. By way of example, a multicast tree having a root 40, a branch point 60, two leaves 80, 100 and network clouds 50, 70, 90 is shown in FIG. 2. Each network cloud 50, 70, 90 comprises an interconnection of transmission links and switching devices which provide the path between the root (source end-system) or branch point and another branch point or a leaf (destination end-system). Congestion points may exist in the network cloud and/or at the leaf (destination end-system). The multicast tree shown in FIG. 2 is for illustrative purposes only and is not intended to limit the number of branches, branch points, leaves or arrangement thereof. FRM cells and data cells received by branch point 60 from the root 40 are replicated (multicast) along each branch downstream in the forward flow direction toward the leaves 80, 100. BRM cells are generated via looping back an FRM cell at the leaf (destination end-system) and/or are directly created by various congestion points, e.g., ATM switches, in the network clouds. BRM cells returning from the leaves and/or the congestion points to the root are consolidated at branch point 60 before being passed back upstream to the root 40. Consolidation of the BRM cells at the branch point prevents BRM cell implosion on the root and maintains the same number of BRM cells returning to the root irrespective of the number of leaves in the tree. In short, branch point 70 replicates the RM cells traveling in a forward direction and consolidates the RM cells traveling in a reverse direction to ensure that cell flows on each branch of the point-to-multipoint tree maintain the same conformance definitions as point-to-point cell flows.

As each copy of the FRM cell travels from the root to the plural leaves in a point-to-multipoint tree, its respective ER field, CI bit and NI bit is marked to convey information regarding the degree of congestion/bandwidth availability of traversed congested points. The congestion information in the ER field, CI bit and NI bit of the RM cell are continuously updated as the cell travels in the forward/reverse flow directions.

As discussed above, in a point-to-multipoint tree the number of BRM cells which reach a particular branch point must be consolidated in order to limit the bandwidth consumed by BRM cells of each multicast branch and ensure that the volume of RM cells for an ABR end-point does not increase with the number of leaves of the multicast tree. On average over an extended period for every FRM cell that reaches a branch point at most one BRM cell is returned or passed back through the branch point towards the root (source end-system).

One conventional solution for performing BRM cell consolidation will be referred to as the "Branch point generation of BRM". In this approach congestion information memory devices are associated with each forward ABR multicast VC at a branch point for storing the ER, CI, NI congestion information. When a BRM cell returns from a branch, the congestion/bandwidth availability information, e.g. ER field, CI bit, and NI bit, of the BRM cell of the current cell is consolidated with the previously stored values in the respective local congestion information memory devices, the updated information is stored in the local congestion information memory devices and the BRM cell is discarded. In a preferred embodiment the ER, CI, NI congestion information memory devices store the result of the min (previous ER, incoming ER), the CI bit of the incoming BRM cell ORed with the previously stored CI bit, and the NI bit of the incoming BRM cell ORed with the previously stored NI bit, respectively. When an FRM cell arrives at a branch point it is multicast downstream along each of the branches of the branch point. In addition, arrival of the FRM cell at the branch point triggers generation of a BRM cell which is sent to the source. Before the generated BRM cell is sent to the source it "picks up" the congestion information stored in the congestion information memory devices. The BRM cell "picks-up" the consolidated congestion/bandwidth availability information by storing in the BRM cell the result of the min(ER stored in congestion information memory devices, ER of the BRM cell), the CI bit stored in congestion information memory devices ORed with the CI bit of the BRM cell, the NI bit stored in the congestion information memory devices ORed with the NI bit of the BRM cell. This approach is disadvantageous in that it requires the switch to generate a large number of BRM cells.

Another well-known conventional scheme for performing BRM cell consolidation is referred to as the "ready-bit" approach. In this approach, for each forward multicast ABR Virtual Channel (VC) passing through a branch point there are a plurality of associated congestion information memory devices such as local registers for consolidating congestion information of all of the destinations along with an additional one-bit memory for storing a "ready-bit". The congestion information memory devices store the congestion network feedback information from the RM cells such as the ER field, CI bit and NI bit. Initially the ready-bit is set to "0" and the congestion information memory devices are reset, that is, the CI and NI bits stored in the congestion information memory devices are set to "0" and the ER register is set to infinity or the maximum link capacity. When a FRM cell arrives at a branch point, the ready-bit for the corresponding forward VC is set to "1". In the reverse direction when a BRM cell arrives at the branch point if the ready-bit is "0", then the congestion/bandwidth availability information, e.g. ER field, CI bit, and NI bit, of the BRM cell of the current cell is consolidated with the previously stored values, the updated information is stored in the congestion information memory devices and the BRM cell is discarded. In a preferred embodiment the congestion information memory devices store the result of the min(previous ER, incoming ER), the CI bit of the incoming BRM cell ORed with the previously stored CI bit, and the NI bit of the incoming BRM cell ORed with the previously stored NI bit, respectively. Otherwise, if the ready-bit is "1" when the BRM cell arrives at a branch point then the BRM cell will "pick-up" the consolidated congestion/bandwidth availability information from the congestion information memory devices and consolidate the stored ER, CI, NI information. The BRM cell "picks-up" the consolidated congestion/bandwidth availability information by performing the min(), OR, OR operations described above for ER, CI and NI, respectively. Thereafter, the congestion information memory devices are reset, that is, the CI and NI bits stored in the congestion information memory devices are set to "0" and the ER value stored in the congestion information memory devices is set to infinity or the maximum link capacity. The BRM cell with the updated congestion information is then passed back to the root (source end-system).

This conventional scheme is disadvantageous for several reasons. Poor transient queue-length is attained, especially during start-up because feedback is dominated by the first BRM cell to arrive at the branch point after a FRM has been sent. Consequently, queue and cell loss will quickly occur at various congestion points in the network cloud along the path from the source to the destination upon receipt of BRM cells from relatively fast close leaves. In addition, the ready-bit approach results in relatively high consolidation noise since a BRM cell may be passed back to the root without waiting for arrival at the branch point of the congestion feedback information from the most congested branch.

In order to prevent the occurrence of consolidation noise the ready-bit approach may be modified in a "wait-for-all" scheme wherein for each FRM cell, at least one BRM cell from every branch must be received at a branch point before passing a BRM cell back to the root. Specifically, when a BRM cell returns, the branch point determines whether a BRM cell has been received from every branch. If a BRM cell has not been received from every branch then the congestion information of the BRM cell is consolidated into the congestion information memory devices and the BRM cell is discarded. When a BRM cell has been received from every branch then the congestion information from the congestion information memory devices is consolidated in the BRM cell, the congestion information memory devices are reset, that is, the CI and NI bits stored in the congestion information memory devices are set to "0" and the ER register is set to infinity or the maximum link capacity, and the BRM cell containing the updated congestion information is passed back to the root (source end-system).

This alternative approach, however, requires a one-bit memory per actual branch for each forward VC to record arrivals of BRM cells in a current cycle. Under practical implementation, a static data structure is used to organize such one-bit memories. The overall memory capacity must therefore be based on the worst-case scenario, e.g. $Mmax*Nmax$ bits at each branching point, where Mmax is the maximum number of branches (fanout) allowed for a forward VC and Nmax is the maximum number of forward VCs allowed at a branching point. Since Mmax and Nmax are worst-case values, instead of the actual number of branches M and active forward VCs N, respectively, they are quite large and, thus, may require a significant amount of memory.

Additional disadvantages associated with this alternative "wait-for-all" scheme is that the branch point is forced to wait for a return BRM cell from every branch thereby slowing down the overall response time. For example, the BRM cell of a bottleneck branch having a corresponding minimum ER value among all branches may arrive at the branching point long before the remaining non-bottleneck branch return BRM cells are received. Even more problematic is that control of the ABR source flow for the entire multicast VCs may cease as a result of a single non-responsive branch, that is, a branch which has not returned a BRM cell.

The transient response time using the wait-for-all BRM consolidation technique may be improved by using Fast Pass Back (FPB). In FPB the ER of the previous pass back BRM cell is stored at a branch point. The ER of each incoming return BRM cell is compared with the ER of the previous pass back BRM cell. If the ER of the incoming return BRM cell is substantially less than the ER of the previous pass back BRM cell then the incoming return BRM cell is passed back immediately without waiting for receipt of the return BRM cells of the remaining branches. The FPB modification of the wait-for-all approach, however, is disadvantageous in that the BRM cell pass back rate may exceed the FRM cell rate at the branch point.

Thus, two competing goals must be balanced, namely waiting for the branch having the minimum ER value in its BRM cell without having to wait for receipt of return BRM cells from every branch. On the one hand, if the branch point waits for receipt of only a few return BRM cells then BRM cells having a non-minimum ER value may be passed back to the root before receipt of the minimum ER carrying BRM cell thereby increasing the queue-length and cell loss. On the other hand, forcing a branch point to wait for receipt of return BRM cells from most of the branches may be disadvantageous for several reasons. If the current ER is greater than the previous pass back ER value, loss of utilization may result. Conversely, if the current ER value is less than the previous pass back ER value, queue-length and cell loss may increase due to unnecessary delay in forcing the root (source end-system) to wait for irrelevant branches. It is therefore desirable to develop a BRM consolidation method that solves the aforementioned problems associated with conventional schemes.

SUMMARY OF THE INVENTION

The present invention is directed to a method for consolidating backward resource management cells in an available bit rate point-to-multipoint tree including a root, a plurality of leaves and a branch point interconnected between the root and the leaves. Initially the congestion information memory devices which store congestion information from the backward resource management cells are reset. For each incoming return backward resource management cell to the branch point a determination is made whether the branch point has received a return backward resource management cell from a predetermined number of candidates in a candidate set of candidate-branches. If the branch point has received a return backward resource management cell from the predetermined number of candidates in the candidate set then the consolidated congestion information from the incoming return backward resource management cell and congestion information in the congestion information memory devices is stored in the incoming return backward resource management cell which is passed back to the root. Otherwise, if the branch point has not received a return backward resource management cell from the predetermined number of candidates in the candidate set then the consolidated congestion information from the incoming return backward resource management cell and the congestion information in the congestion information memory devices are stored in the congestion information memory devices and the incoming return backward resource management cell is discarded.

In addition, the invention relates to a method for controlling a rate of pass back of incoming return backward resource management cells at a branch point to a source for available bit rate service in an asynchronous transfer mode network. A token is generated by a token generator for each forward resource management cell that arrives at the branch point and is stored in a token bucket. For each incoming backward resource management cell that arrives at the branch point a determination is made whether a token is available in the token bucket. If a token is not available then the congestion information in the incoming backward resource management cell is consolidated in the congestion information memory devices and the incoming backward resource management cell is then discarded. Otherwise, the consolidated congestion information from the incoming return backward resource management cell and congestion information in the congestion information memory devices is stored in the incoming return backward resource management cell which is then passed back to the root and a token is removed from the token bucket.

Furthermore, the invention is directed to a method for consolidating backward resource management cells at a branch point root for available bit rate service in an asynchronous transfer mode network. For each incoming return backward resource management cell a determination is made whether criteria for pass back of the incoming return backward resource management cell is satisfied. If the criteria for pass back of the incoming return backward resource management cell is satisfied then the incoming return backward resource management cell is passed back. Otherwise, a ratio of an incoming explicit rate of an incoming return backward resource management cell to a historical explicit rate of previous return backward resource management cells is calculated and a fast pass back probability value corresponding to the calculated ratio is determined based on a dynamically adjusted non-decreasing fast pass back probability function. Then a random number is generated and a determination is made whether the randomly generated number is less than or equal to the fast pass back probability value. If the randomly generated number is less than or equal to the fast pass back probability value then the incoming return backward resource management cell congestion information from the incoming return backward resource management cell is consolidated with the congestion information stored in the congestion memory devices and the consolidated incoming return backward resource management cell is passed back to the root. Otherwise, if the random number is greater than the fast pass back probability value then in the congestion information memory devices the congestion information from the incoming return backward resource management cells is consolidated with the congestion information stored in the congestion information memory devices and the incoming return backward resource management cell is discarded.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE INVENTION

Figure 1:
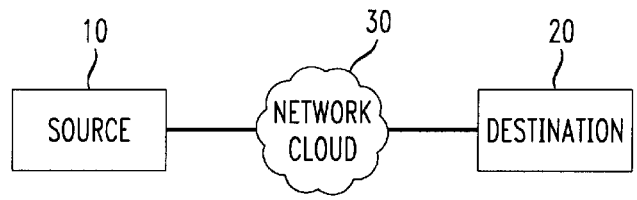
FIG. 1 is a flow control diagram for a point-to-point arrangement.
Figure 2:
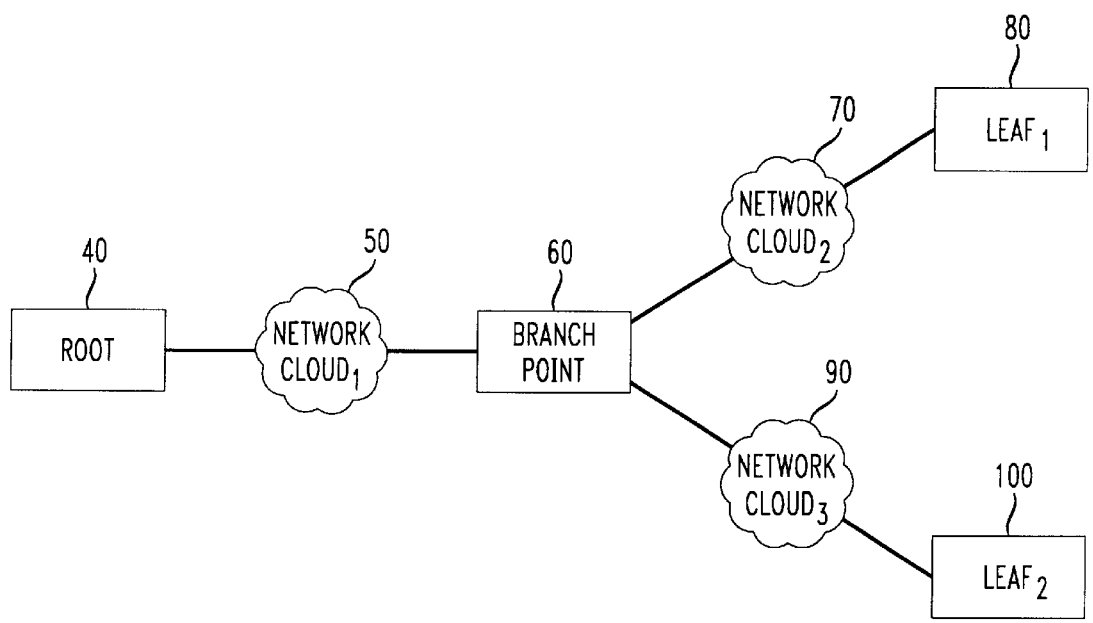
FIG. 2 is a flow control diagram for a point-to-multipoint tree.

The present invention is directed to a candidate set BRM consolidation method for ABR service in a point-to-multipoint connection ATM network. Instead, of forcing a branch point to wait for return of BRM cells from all M branches, where M represents the total number of branches at a branch point, the branch point is required to wait for only a predetermined number k of candidate-branches from a candidate set having a total number of K candidate-branches, where k≦K and K≦M. As a result, the candidate set BRM consolidation method requires less memory per forward VC than the conventional "wait-for-all" BRM cell consolidation method. In particular, the conventional "wait-for-all" approach, which requires a memory of size O(Mmax), where O( ) is the order function as described by Thomas H. Cormen et al., *Introduction to Algorithms*, MIT Press (1990), which is herein incorporated by reference, and Mmax is the maximum number of branches in the fanout. However, the candidate set K requires a smaller memory of size $$O(K[1+\log_2(Mmax)])$$

where

O( ) is the order function;

K is the total number of candidate-branches in the candidate set, generally K≦M<<Mmax, where Mmax is the maximum number of branches in the fanout.

The predetermined number of candidate-branches k may be set to a value less than the total number of candidate-branches K in the candidate set to prevent a single non-responding branch, that is a candidate-branch which has not returned a BRM cell, from interrupting or halting pass back of the BRM cell to the root (source). In a preferred embodiment if a branch is determined to be "non-responding" or the corresponding leaf is no longer part of the multicast tree, the candidate-branch should be immediately removed from the candidate set so that the current round of BRM consolidation does not wait for return BRM cells from these branches.

In addition, because the branch point, in the candidate set approach is required to wait for only k candidate-branches from a candidate set of a total number of K candidate-branches it is possible to eliminate unnecessary waiting for responses from irrelevant non-bottleneck branches as in the case of the "wait-for-all" scheme. Consolidation noise may be further reduced by predicting in advance which branches have a higher probability of incurring a congestion bottleneck and selecting these branches as the candidate set. Thus, a particular branch point will wait to receive return BRM cells of k candidate-branches from the candidate set before pass back of a return BRM cell to ensure that the true or extreme congestion feedback information has been received by the branch point prior to pass back of a return BRM cell to the root.

Several criteria may be used to predict in advance which branches are most likely to encounter a bottleneck. For example, the candidate set of branches may include those branches whose corresponding return BRM cells have an ER value which is the smallest, 2nd smallest, . . . , mth smallest amongst ER values of incoming BRM cells from all the branches at a branching point in the previous cycle or previous n cycles, where m, n>1. Another criteria may be to include in the candidate set those branches which have the largest, 2nd largest, . . . , pth largest propagation delay and/or whose propagation delay exceeds some predetermined threshold. The propagation delay may be estimated from the fixed round-trip time (FRTT) information in the signaling message when the leaf-connection is setup. Alternatively, the propagation delay can be estimated from various online/offline measurement techniques, as for example based on loop back of operations, administration and maintenance (OAM) or RM cells. In another embodiment, the candidate set may be limited to the branches connected to an output link having the smallest physical capacity, as for example a T1 link vs. an OC12 link. Still another approach is to include in the candidate set the branches having the most bursty higher priority traffic. The candidate set may also be selected dynamically such as by including all, or some, of the new branches and/or leaves to the multicast tree or be defined by the random selection of one or more branches in the multicast tree. These criteria for selection of the candidate set may be used alone, or in any combination thereof, for defining the candidate set. The identified criteria are not exclusive and additional criteria are contemplated and within the intended scope of this invention.

The K candidate-branches comprising the candidate set may be identified by branch-ID information carried directly in the BRM cell. In some common implementations, the BRM cell does not directly carry its corresponding branch-ID information, but instead may carry a unique Virtual Channel Identifier (VCID) while the mapping between VCID and branch-ID is known at the branching point. Either the VCID or the branch-ID information may be used to specify candidate-branches in the candidate set. Since the address space of VCID is generally substantially larger than that of the branch-ID, less memory is required to encode the branch-ID than the VCID. Identification of the branch-candidates in a candidate set by their corresponding branch-ID requires on-the-fly translation of the VCID carried by a return BRM cell to branch-ID since the branch-ID is not directly carried by the BRM cell. Thus, the use of branch-IDs reduces memory requirements at the expense of increased computation.

Figure 4:
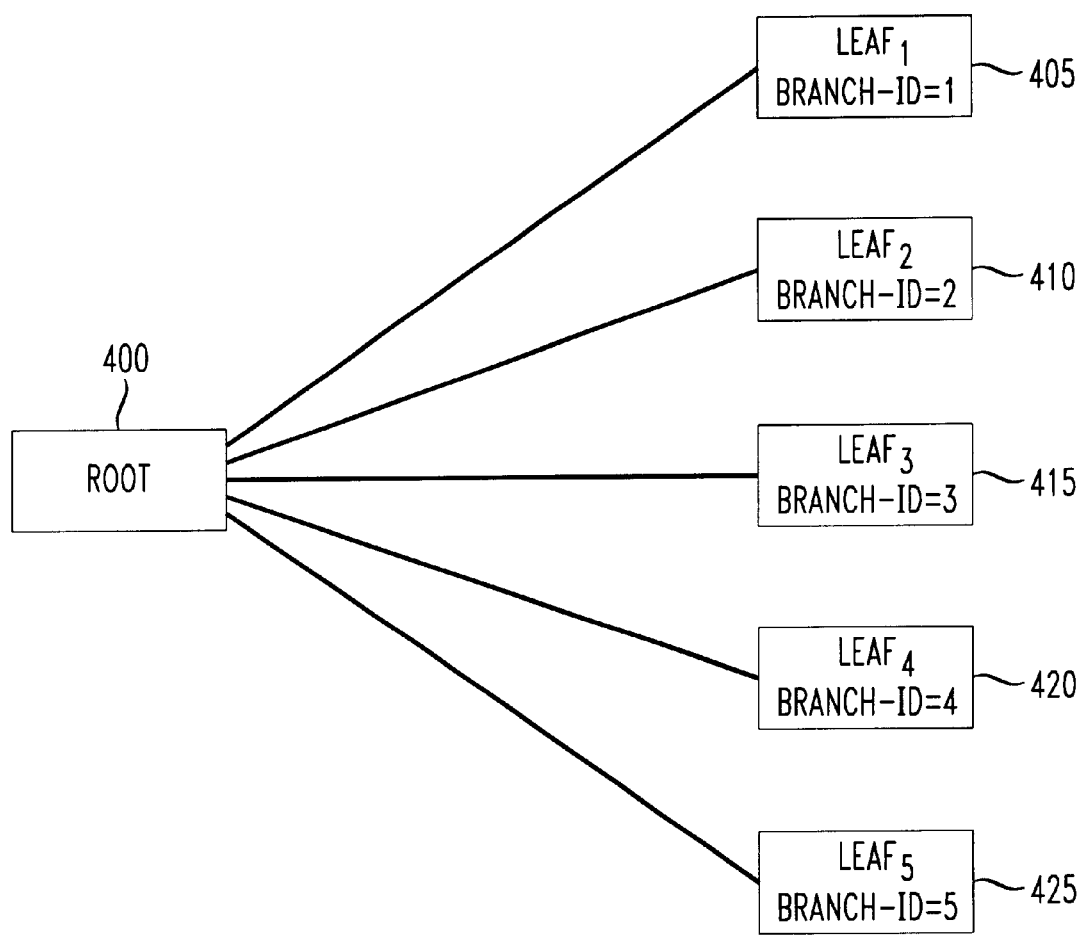
FIG. 4 is an example of a candidate set with one branch-candidate identified by its respective branch-identification code and the remaining branch-candidates defined by an offset value relative to the identified branch-candidate.

In an alternative embodiment, one or more of the candidate-branches in the candidate set may be identified by their respective unique branch-ID while some, but not necessarily all, of the other candidate-branches are identified by some predetermined offset value relative to the identified candidate-branch. By way of example, a point-to-multipoint tree is shown in FIG. 4 in which a root 400 is connected to five leaves (ports) 405, 410, 415, 420, 425 by five branches. By way of example, the candidate set may be selected to include two candidate-branches of which the first candidate-branch is randomly selected while the second candidate-branch is identified by some predetermined offset value relative to the first candidate-branch. If the first candidate-branch is randomly selected as branch-$ID_3$ and the predetermined offset value of the second branch-candidate is set to four then in a first round of BRM consolidation the second branch-candidate is calculated as (branch-ID+offset)mod (number of branches)=(3+4)mod(5)=2 corresponding to branch-$ID_2$. It should be noted that the branch-ID of the first candidate-branch wraps around when it increases beyond the total number of branches for the forward VC. This wrap around feature is realized by the modular function "mod( )" which provides the remainder of the integer division. Thus, the branch point will wait for replies from branch-$ID_3$(the first candidate-branch) and branch-$ID_2$(the second candidate-branch) before passing back of the BRM cell to the root. The branch-ID of the second candidate-branch is computed during reverse flow via hardware using the branch-ID of the first candidate branch and the offset value. The resultant branch-ID is then compared to the branch-ID of the returning BRM cell after it has been converted on-the-fly from the VCID information carried by the BRM cell.

In the example provided, during the second round, the first candidate branch-ID is incremented by 1 to branch-$ID_4$ while the offset remains fixed at 4 so that the first candidate is now branch-$ID_4$ and the second candidate is (4+4)mod (5)=3 or branch-ID$_3$. In the example provided, the branch-ID of the first candidate was incremented by 1 for each round, however, any predetermined increment value may be used. Since the maximum possible offset value may be smaller than the maximum number of branches for a forward VC, this approach may require less memory to identify the candidates comprising the candidate set in comparison with schemes which identify every candidate in the candidate set by their unique branch-IDs.

In the embodiments described one or more candidates in the candidate set are identified by their respective branch. Alternatively, each candidate in the candidate set may be identified by a switch port/subport. This method of identification is based on the assumption that VC branches returning from the same port/subport experience similar bottleneck congestion. It is advantageous to identify the returning BRM cells by the switch port/subport instead of the branch since the maximum number of switch ports/subports is generally significantly smaller then the maximum number of branches and, thus, requires substantially less memory.

To further optimize performance and reduce consolidation noise the FPB technique may be employed with the candidate consolidation technique to allow immediate pass back of a return BRM cell without waiting for the branch point to receive return BRM cells from every candidate-branch in the candidate set. In the prior art the FPB determination is based on a comparison of whether the ER of the current BRM cell is less then the previous ER by some predetermined fixed threshold value. If the ER of the current BRM cell is less then the previous ER by some predetermined fixed threshold value then the return BRM cell is immediately passed back to the root without waiting for replies from additional return BRM cells. In a modification of this conventional approach, the FPB is assigned a probability value represented by a dynamically adjusted non-decreasing function of the ratio of the ER of the incoming return BRM cell to a historical ER value. This dynamically adjusted non-decreasing function is preferably stored in a look-up-table (LUT). A ratio of the ER of the incoming return BRM cell to a historical ER value is calculated and the corresponding FPB probability is retrieved from the LUT, where $0 \leq$ FPB probability $\leq 1$. The historical ER value may be any function of previous ER values. For example, the historical ER value may be the ER value for a given branch of a branch point from the immediate preceding pass back round. In another embodiment, the historical ER value may be a function of the ER values from one or more branches over one or more pass back rounds. For example, upon pass back of a BRM cell to the root the historical ER value may be updated using a well-known smoothing function as $$ER_{historical} = (1-\text{alpha}) \cdot ER_{historical} + \text{alpha} \cdot minER_{ipb}$$

where $0 \leq \text{alpha} \leq 1$;

$minER_{ipb}$ is the minimum ER value carried by incoming BRM cells amongst all branches at the branching point during the immediate pass back round.

After calculating the ratio of the incoming ER value/historical ER value the corresponding FPB probability is ascertained from the LUT, and a random number with uniform distribution between 0 and 1 is generated. If the randomly generated number is less than or equal to the FPB probability then the incoming return BRM cell is immediately passed back to the root, otherwise the congestion information from the incoming return BRM cell will be consolidated into the congestion information memory devices and the cell will be discarded. By way of example, given a FPB probability of 0.7, if a random number 0.3 is generated then the incoming return BRM cell will be immediately passed back to the root without waiting for replies from additional branches. If, however, the randomly generated number is 0.9 then the incoming return BRM cell will not be passed back to the root. The non-decreasing function used to represent the FPB probability and/or the FPB probability threshold may be dynamically controlled to reduce consolidation noise and optimize system performance. It should be noted that the use of a dynamically controlled FPB function may be used with BRM consolidation methods other than the candidate-set approach.

Figure 5:
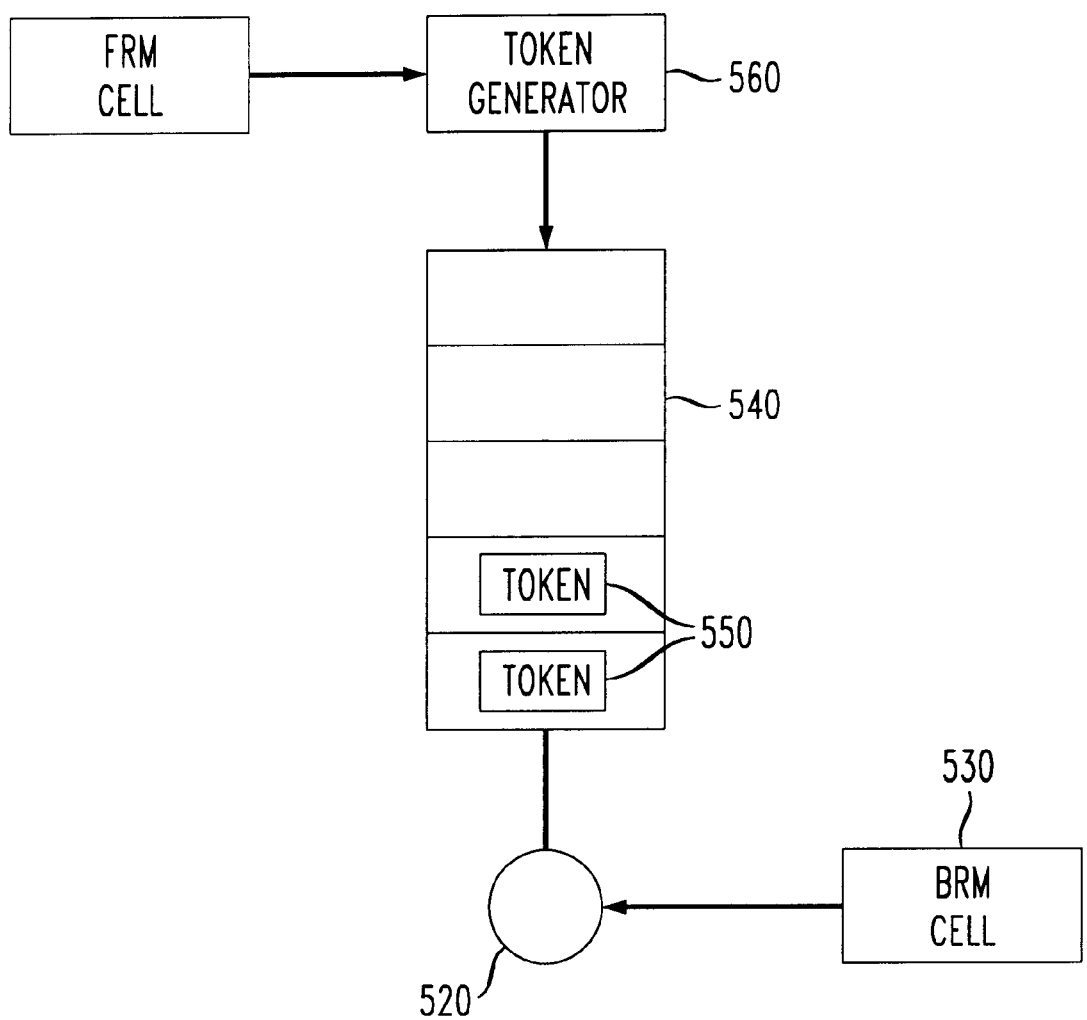
FIG. 5 is a leaky-bucket device in accordance with the present invention to control the rate of pass back of BRM cells at a branch point based on the rate of arrival of FRM cells to the branch point.

In still another embodiment, as shown in FIG. 5, a leaky-bucket scheme may be employed to limit the rate of pass back of BRM cells to the root regardless of the type of pass back, e.g. normal pass back or FPB. The arrival of each FRM cell at the branch point 520 triggers the generation by a token generator 560 of a single token 550 which is stored in a token-bucket 540 of finite size. When a determination is made to pass back a BRM cell, it will only be passed back to the root if there is at least one available token remaining in the token-bucket. If at least one token is remaining in the token-bucket then the BRM cell is passed back and a token is removed from the token-bucket. Otherwise, the congestion information in the incoming return BRM cell may be consolidated in the congestion information memory devices and the BRM cell may be discarded. In this case, pass back is not realized until a FRM cell arrives at the branch point followed by arrival of a new incoming return BRM cell. Thus, using the leaky-bucket prevents the long-term average BRM pass back rate during normal and/or FPB from exceeding the long-term average FRM arrival rate at the branch point for the corresponding multicast VC.

The candidate set approach is advantageous over conventional BRM consolidation techniques in that the candidates in the candidate set may be identified using software instead of hardware. Accordingly, the candidate set at each branch point may be dynamically changed even within the same round of BRM consolidation/pass back. Alternatively, some changes in the candidate set may not be scheduled to take effect until after completion of the current round of consolidation/pass back. Since the candidate set K is an entirely local decision each branch point may have different candidate set requirements depending on the traffic profile/applications. Moreover, since the candidate set for a branch point may be controlled using software the candidate set may be adjusted on-the-fly as leaves and/or branches are added/withdrawn in a dynamic multicast tree.

Since the actual number of branches for a given realization of a multicast VC is usually significantly less than the maximum allowable number of branches at a branch point, even a relatively small or moderately sized candidate set provides substantially the same coverage results realized by the "wait-for-all" approach but with significantly less memory requirements.

Figure 3:
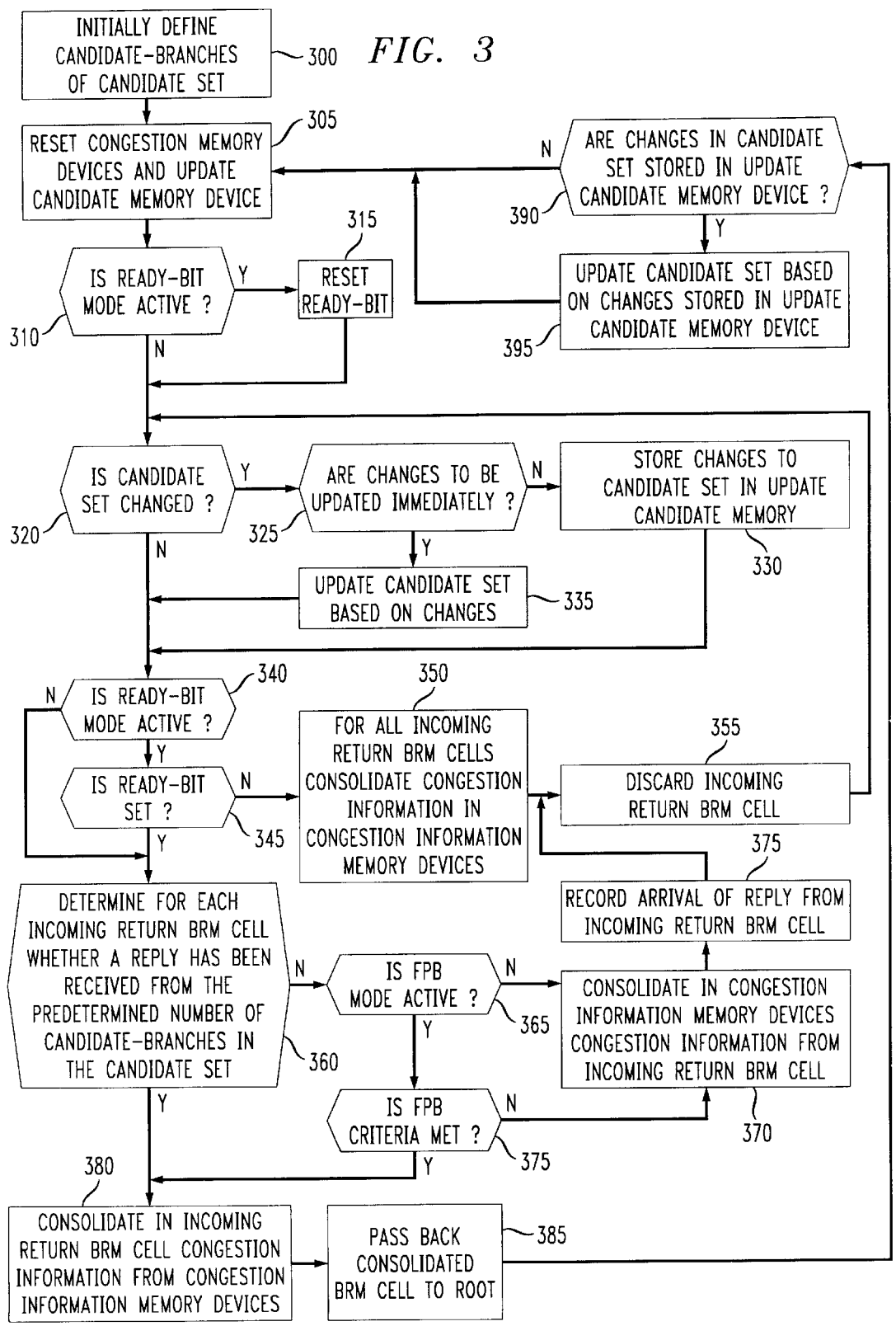
FIG. 3 is a flow chart of the backward resource management cell consolidation method in accordance with the present invention.

FIG. 3 is a flow chart of the inventive candidate set BRM consolidation method. In step 300 the candidate-branches comprising the candidate set are initially defined. Then in step 305 congestion information memory devices such as local registers which store the consolidated congestion information from the incoming return BRM cells are reset. Specifically, in step 305 the CI and NI bits stored in the congestion information memory devices are reset to "0" and the stored ER value is reset to infinity or the maximum link capacity.

It has been recognized that in some cases efficiency and performance may be improved by combining the candidate set BRM consolidation method and the conventional "ready-bit" approach. In those situations in which performance results would be improved by using both the candidate set and ready-bit schemes a "ready-bit" mode may optionally be activated. Thus, in steps 310 and 315 a determination is made whether the "ready-bit" mode has been activated and, if so, then the "ready-bit" is reset to "0" and will be set to "1" upon arrival of a next FRM cell at the branch point.

Steps 320–335 are processing steps for updating the candidates in the candidate set. In step 320 a determination is made whether the candidate set has been redefined. If the candidate set has been redefined, then a determination is made in step 325 whether the candidate set is to be updated immediately or after the current round of BRM pass back. In the case where the candidate set is to be updated after the current round of BRM pass back, an updated candidate set memory device stores the redefined candidate set until completion of the current round of BRM pass back; otherwise, the candidate set is updated immediately in step 335.

Processing steps 340–355 are implemented when the "ready-bit" mode has been activated. A determination is made in step 340 whether the "ready-bit" mode is active and, if it is and the result of determination step 345 is that the "ready-bit" is not set then in steps 350 and 355 the congestion information of all incoming return BRM cells is consolidated in the congestion information memory devices and the incoming return BRM cell is discarded. If, however, the "ready-bit" mode is inactive or if the "ready-bit" mode is active and the "ready-bit" is set, then in step 360 a determination is made for each incoming return BRM cell whether a reply has been received from a predetermined number K of candidates in the candidate set, where $k \leq K$. In the case where a reply has not been received from a predetermined number k of candidates, a determination is made in step 365 whether an optional FPB mode is active. If FPB mode is inactive, then in steps 370 and 375 congestion information of the incoming return BRM cell is consolidated in the congestion information memory devices, the arrival of incoming return BRM cells of the candidates in the candidate set is recorded, and the incoming return BRM cell is discarded. Otherwise, if the result of steps 365 and 380 is that the FPB mode is active and the FPB criteria is met, or if in step 360 the branch point has received an incoming return BRM cell from the predetermined number k of candidates from the candidate set, then in steps 385 and 390 the incoming return BRM cell picks-up the consolidated congestion information stored in the congestion information memory devices and passes back the updated BRM cell back to the root. In steps 391 and 392 if the candidate set has been redefined but is not scheduled to be updated until completion of the current round of BRM pass back then at this point in time,: the candidate set is updated in steps 392 and the process is repeated for a next round of pass back.

It should be noted that the flow chart shown in FIG. 3 represents the preferred embodiment of the present invention, however, the invention may be implemented without the ability to update the candidates comprising the candidate s et, the ability to implement a "ready-bit" mode, and/or the ability to implement a FPB mode.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for consolidating backward resource management cells in an available bit rate point-to-multipoint tree including a root, a plurality of leaves and a branch point interconnected between said root and said leaves, said method comprising the steps of:

(a) resetting congestion information memory devices which store congestion information from the backward resource management cells;

(b) determining for each incoming return backward resource management cell to the branch point whether the branch point has received a return backward resource management cell from a predetermined number of candidates in a candidate set of candidate-branches, wherein if the branch point has received a return backward resource management cell from the predetermined number of candidates in the candidate set then advancing to step (f);

(c) consolidating in the congestion information memory devices congestion information from the incoming return backward resource management cell with the congestion information in the congestion information memory devices;

(d) discarding the incoming return backward resource management cell;

(e) repeating the processing beginning with step (b);

(f) consolidating in the incoming return backward resource management cell congestion information from the incoming return backward resource management cell with the congestion information in the congestion memories;

(g) passing back the consolidated incoming return backward resource management cell to the root; and (h) repeating the process beginning with step (a).

2. A method in accordance with claim 1, before step (a), defining the candidate-branches comprising the candidate set.

3. A method in accordance with claim 2, wherein the step of defining the candidate set comprises selecting as the candidate-branches those branches having a kth smallest explicit rate in a last cycle, where k is a predetermined positive integer.

4. A method in accordance with claim 2, wherein the step of defining the candidate set comprises selecting as the candidate-branches those branches having a kth smallest explicit rate in a predetermined number of previous cycles, where k is a predetermined positive integer.

5. A method in accordance with claim 2, wherein the step of defining the candidate set comprises selecting as the candidate-branch the branch having a largest propagation delay.

6. A method in accordance with claim 2, wherein the step of defining the candidate set comprises selecting as the candidate-branches those connected to an output link having a smallest physical capacity.

7. A method in accordance with claim 2, wherein the step of defining the candidate set comprises selecting as the candidate-branches those having most bursty higher priority traffic.

8. A method in accordance with claim 2, wherein the step of defining the candidate set comprises selecting as the candidate-branches those branches which are newly added to the multicast tree.

9. A method in accordance with claim 2, wherein the step of defining the candidate set comprises randomly selecting the candidate-branches.

10. A method in accordance with claim 2, wherein the step of defining the candidate set comprises identifying at least one of the candidate-branches by their respective port.

11. A method in accordance with claim 2, wherein the step of defining the candidate set comprises identifying at least one of the candidate-branches by their respective branch.

12. A method in accordance with claim 2, wherein the step of defining the candidate set comprises identifying at least one of the candidate-branches by their respective branch-identification.

13. A method in accordance with claim 12, wherein the step of defining the candidate set comprises identifying at least one other candidate-branch by a predetermined offset value relative to the candidate-branch identified by its respective branch-identification.

14. A method in accordance with claim 1, wherein step (b) further comprises defining the predetermined number of candidates to be less than or equal to a total number of branches in the candidate set.

15. A method in accordance with claim 1, wherein step (a) comprises setting an explicit rate memory device to infinity and a congestion indication memory device and no increase memory device to zero.

16. A method in accordance with claim 1, wherein step (g) comprises controlling a rate of pass back of the consolidated backward resource management cell.

17. A method in accordance with claim 16, wherein said controlling step comprises the steps of:
(i) generating a token for each forward resource management cell arriving at a branch point;
(j) storing the generated tokens in a token bucket;
(k) determining for each incoming return backward resource management cell whether a token is available in the token bucket, wherein if a token is not available in the token bucket then advancing to step (p);
(l) consolidating in the incoming return backward resource management cell the congestion information from the incoming return backward resource management cell and the congestion information in the congestion memory devices;
(m) passing back the consolidated incoming return backward resource management cell;
(n) removing a token from the token bucket;
(o) returning to step (h);
(p) consolidating in the incoming return backward resource management cell the congestion information from the incoming return backward resource management cell and the congestion information in the congestion memory devices;
(q) discarding the incoming return backward resource management cell; and
(r) returning to step (i).

18. A method for consolidating backward resource management cells in an available bit rate point-to-multipoint tree including a root, a plurality of leaves and a branch point interconnected between said root and said leaves, said method comprising the steps of:
(a) defining an initial candidate set of candidate-branches;
(b) resetting congestion memory devices which store congestion information from the backward resource management cells and an update candidate memory device for storing changes in the candidate set;
(c) determining whether the candidate set has been changed, wherein if the candidate set has not been changed advancing to step (f);
(d) determining whether the candidate set should be updated immediately, wherein if the candidate set should be updated immediately then updating the candidate set based on the changes and advancing to step (f);
(e) recording the changes in the candidate set in the update candidate memory device;
(f) determining for each incoming return backward resource management cell to the branch point whether the branch point has received a return backward resource management cell from a predetermined number of candidates in the candidate set, wherein if the branch point has received a return backward resource management cell from the predetermined number of candidates in the candidate set then advancing to step (j);
(g) consolidating in the congestion memory devices congestion information from the incoming return backward resource management cell with the congestion information in the congestion memory devices;
(h) discarding the incoming return backward resource management cell;
(i) returning to step (c);
(j) consolidating in the incoming return backward resource management cell congestion information from the incoming return backward resource management cell with the congestion information in the congestion memory devices;
(k) passing back the consolidated incoming return backward resource management cell to the root; and
(l) determining whether changes in the candidate set are stored in the update candidate memory device, wherein if changes in the candidate set are stored in the update candidate memory device updating the candidate set based on the changes in the candidate set stored in the update candidate memory device; and
(m) repeating the process beginning with step (b).

19. A method for consolidating backward resource management cells in an available bit rate point-to-multipoint tree including a root, a plurality of leaves and a branch point interconnected between said root and said leaves, said method comprising the steps of:
(a) resetting congestion information memory devices which store congestion information from the backward resource management cells;
(b) determining whether a ready-bit mode has been activated, wherein if the ready-bit mode is inactive advancing to step (h);
(c) resetting a ready-bit;
(d) setting of the ready-bit upon arrival of a forward resource management cell at the branch point, wherein if the ready-bit is set advancing to step (h);
(e) consolidating for each incoming return backward resource management cell congestion information from each incoming return backward resource management cell into the congestion information memory devices;

(f) discarding the incoming return backward resource management cell;

(g) returning to step (d);

(h) determining for each incoming return backward resource management cell to the branch point whether the branch point has received a return backward resource management cell from a predetermined number of candidates in a candidate set of candidate-branches, wherein if the branch point has received a return backward resource management cell from the predetermined number of candidates in the candidate set then advancing to step (l);

(i) consolidating in the congestion memory devices congestion information from the incoming return backward resource management cell with the congestion information in the congestion memory devices;

(j) discarding the incoming return backward resource management cell;

(k) returning to step (h);

(l) consolidating in the incoming return backward resource management cell congestion information from the incoming return backward resource management cell with the congestion information in the congestion memory devices;

(m) passing back the consolidated incoming return backward resource management cell to the root; and (n) repeating the process beginning with step (a).

20. A method for consolidating backward resource management cells in an available bit rate point-to-multipoint tree including a root, a plurality of leaves and a branch point interconnected between said root and said leaves, said method comprising the steps of:

(a) resetting congestion information memory devices which store congestion information from the backward resource management cells;

(b) determining for each incoming return backward resource management cell to the branch point whether the branch point has received a return backward resource management cell from a predetermined number of candidates in a candidate set of candidate-branches, wherein if the branch point has received return backward resource management cells from the predetermined number of candidates in the candidate set, then advancing to step (h);

(c) determining whether a fast pass back mode has been activated, wherein if the fast pass back mode is inactive advancing to step (e);

(d) determining whether a fast pass back criteria is satisfied, wherein if the fast pass back criteria is satisfied advancing to step (h);

(e) consolidating in the congestion memory devices congestion information from the incoming return backward resource management cell with the congestion information in the congestion memory devices;

(f) discarding the incoming return backward resource management cell;

(g) repeating the process beginning with step (b);

(h) consolidating in the incoming return backward resource management cell congestion information from the incoming return backward resource management cell with the congestion information in the congestion memory devices;

(i) passing back the consolidated incoming return backward resource management cell to the root; and (j) repeating the process beginning with step (b).

21. A method in accordance with claim 20, wherein step (d) comprises:

(k) calculating a ratio of an incoming explicit rate of the incoming return backward resource management cell to a historical explicit rate of previous return backward resource management cells;

(l) determining from a dynamically adjusted non-decreasing fast pass back probability function a fast pass back probability value corresponding to the calculated ratio;

(m) generating a random number;

(n) determining whether the randomly generated number is less than or equal to the fast pass back probability value, wherein if the randomly generated number is less than or equal to the fast pass back probability value returning to step (h);

(o) returning to step (e).

22. A method in accordance with claim 21, wherein step (m) comprises generating a random number with uniform distribution between 0 and 1.

23. A method in accordance with claim 21, wherein step (k) comprises calculating the historical explicit rate as $$ER_{historical}=(1-alpha)*ER_{historical}+alpha*minER_{ipb}$$

where $0 \leq alpha \leq 1$;

$minER_{ipb}$ is a minimum explicit rate value during an immediate pass back round.

24. A method in accordance with claim 21, wherein step (k) comprises setting the historical explicit rate equal to an explicit rate of an immediate preceding pass back round.

25. A method in accordance with claim 20, wherein step (l) comprises retrieving the fast pass back probability value from a look-up-table.

26. A method for controlling a rate of pass back of incoming return backward resource management cells at a branch point to a source for available bit rate service in an asynchronous transfer mode network, comprising the steps of:

(a) generating a token for each forward resource management cell arriving at the branch point;

(b) storing the generated tokens in a token bucket;

(c) determining for each incoming return backward resource management cell whether a token is available in the token bucket, wherein if a token is not available in the token bucket then advancing to step (h);

(d) consolidating in the incoming return backward resource management cell the congestion information from the incoming return backward resource management cell and congestion information in congestion memory devices;

(e) passing back the consolidated incoming return backward resource management cell;

(f) removing a token from the token bucket;

(g) repeating the process beginning with step (a);

(h) consolidating in the incoming return backward resource management cell the congestion information from the incoming return backward resource management cell and the congestion information in the congestion memory devices;

(i) discarding the incoming return backward resource management cell; and (j) repeating the process beginning with step (a).

27. A method for consolidating backward resource management cells at a branch point root for available bit rate service in an asynchronous transfer mode network, comprising:

(a) determining for each incoming return backward resource management cell whether criteria for pass back of the incoming return backward resource management cell is satisfied, wherein if the criteria for pass back of the incoming return backward resource management cell is satisfied, passing back the incoming return backward resource management cell and repeating the process beginning with step (a);

(b) calculating a ratio of an incoming explicit rate of an incoming return backward resource management cell to a historical explicit rate of previous return backward resource management cells;

(c) determining based on a dynamically adjusted non-decreasing fast pass back probability function a fast pass back probability value corresponding to the calculated ratio;

(d) generating a random number;

(e) determining whether the randomly generated number is less than or equal to the fast pass back probability value, wherein if the randomly generated number is less than or equal to the fast pass back probability value advancing to step (i);

(f) consolidating in congestion information memory devices congestion information from the incoming return backward resource management cells and congestion information stored in the congestion information memory devices;

(g) discarding the incoming return backward resource management cell;

(h) repeating the process beginning with step (a);

(i) consolidating in the incoming return backward resource management cell congestion information from the incoming return backward resource management cell with the congestion information stored in the congestion memory devices;

(j) passing back the consolidated incoming return backward resource management cell to the root; and (k) repeating the process beginning with step (a).

28. A method in accordance with claim 27, wherein step (b) comprises calculating the historical explicit rate as $$ER_{historical}=(1-alpha)*ER_{historical}+alpha*minER_{ipb}$$

where $0 \leq alpha \leq 1$;

$minER_{ipb}$ is a minimum explicit rate value during an immediate pass back round.

29. A method in accordance with claim 27, wherein step (b) comprises setting the historical explicit rate equal to an explicit rate of an immediate preceding pass back round.

30. A method in accordance with claim 27, wherein step (c) comprises retrieving the fast pass back probability value from a look-up-table.

* * * * *